(12) United States Patent
Dorny et al.

(10) Patent No.: US 7,117,107 B2
(45) Date of Patent: Oct. 3, 2006

(54) COMPUTERIZED METHODS FOR DATA LOGGERS

(75) Inventors: Jonathan Dorny, Lumberton, NC (US); Robert George, Wilmington, NC (US)

(73) Assignee: Remote Data Systems, Inc., Whiteville, NC (US)

( * ) Notice: Subject to any disclaimer, the term of this patent is extended or adjusted under 35 U.S.C. 154(b) by 0 days.

(21) Appl. No.: 11/064,494

(22) Filed: Feb. 23, 2005

(65) Prior Publication Data

US 2005/0144356 A1 Jun. 30, 2005

(51) Int. Cl.
*G06F 15/00* (2006.01)

(52) U.S. Cl. .................................................. 702/63

(58) Field of Classification Search .................. 702/63, 702/58; 320/127; 324/425; 340/636.1; 700/292

See application file for complete search history.

(56) References Cited

U.S. PATENT DOCUMENTS

| | | | |
|---|---|---|---|
| 4,910,692 | A | 3/1990 | Outram et al. |
| 5,016,196 | A | 5/1991 | Nelson et al. |
| 5,031,452 | A | 7/1991 | Dobson et al. |
| 5,342,144 | A | 8/1994 | McCarthy |
| 5,394,748 | A | 3/1995 | McCarthy |
| 5,497,663 | A | 3/1996 | Reay et al. |
| 5,564,285 | A | 10/1996 | Jurewicz et al. |
| 5,623,416 | A | 4/1997 | Hocker, III |
| 5,805,909 | A | 9/1998 | Diewald |
| 5,864,059 | A | 1/1999 | Sturm et al. |
| 5,872,967 | A | 2/1999 | DeRoo et al. |
| 5,920,827 | A * | 7/1999 | Baer et al. ..................... 702/3 |
| 6,073,243 | A | 6/2000 | Dalvi et al. |
| 6,091,530 | A | 7/2000 | Duckworth |
| 6,142,298 | A | 11/2000 | Wu |
| 6,198,820 | B1 | 3/2001 | Tetsushi |
| 6,282,675 | B1 | 8/2001 | Sun et al. |
| 6,285,955 | B1 | 9/2001 | Goldwasser |
| 6,385,739 | B1 | 5/2002 | Barton et al. |
| 6,407,534 | B1 | 6/2002 | Mukainakano |
| 6,411,911 | B1 | 6/2002 | Hirsch et al. |
| 6,629,248 | B1 * | 9/2003 | Stachura et al. ............. 713/340 |
| 6,798,353 | B1 * | 9/2004 | Seal et al. ............. 340/870.02 |

OTHER PUBLICATIONS (searchmobilecomputing.com definitions RAM) [online] Retrieve from the internet on Apr. 20, 2006. <http://searchmobilecomputing.techtarget.com/sDefinition/0,,sid40_gci214255,00.html>.*
(searchstorage.com Definitions flash memory) [online] Retrieve from the internet on Apr. 20, 2006 <http://searchstorage.techtarget.com/sDefinition/0,,sid5_gci212130,00.html>.*
(searchstorage.com Definitions Shadow RAM) [online] retrieve from the internet on Apr. 20, 2006 <http://searchstorage.techtarget.com/sDefinition/0,,sid5_gci212975,00.html>.*

* cited by examiner

*Primary Examiner*—Bryan Bui
*Assistant Examiner*—Tung S. Lau
(74) *Attorney, Agent, or Firm*—MacCord Mason PLLC

(57) ABSTRACT

The present invention provides methods for operating data loggers and in particular, software techniques useful for controlling the critical functions of a low-power-battery-operated data logger. One method initializes various memory locations upon a detection of new firmware. Another method allows a processor system belonging to a data logger to receive a high baud rate data stream while being operated in a sleep mode. Yet another method provides a highly efficient process for estimating the remaining battery capacity of a data logger's primary power source. Finally, a method is provided for protecting volatile variables during a disruption of primary power. The protected variables are written to non-volatile memory using parasitic power only.

4 Claims, 7 Drawing Sheets

COMPUTERIZED METHODS FOR DATA LOGGERS

BACKGROUND OF THE INVENTION (1) Field of the Invention

The present invention relates to methods for operating data loggers. In particular, the invention provides software techniques useful for controlling the critical functions of low-power-battery-operated data loggers.

(2) Description of the Prior Art

Generally speaking, data loggers are devices that record measurements obtained from electronic sensors that sense physical properties such as temperature, pressure, electrical current and voltage among others. A conventional data logger is made up of a digital processor operationally connected to a non-volatile memory bank for storing measurements obtained from electronic sensors in communication with the data logger. Other major components include at least one digital communication port for communicating with an external user interface device such as a personal computer (PC) or personal digital assistant (PDA) and a real-time clock for keeping track of time as well as calendar dates. Additional components can include sensor interfaces such as analog-to-digital converters and event counters used to convert analog signals and discrete events into digital form for storage into the non-volatile memory bank.

The external user interface device allows a user to transfer recorded data from a data logger to a data processor so that the recorded data can be processed and presented in a useful manner. Furthermore, most, if not all data loggers have settings and parameters that must be initialized by the user. For example, conventional data loggers have real-time clock and calendar variables that must be set by the user. In order to set these variables, a user typically transfers values for the variables to a data logger through a PDA running software having a graphical user interface that includes a clock/calendar settings form. After the user inputs the desired clock/calendar settings into the PDA by way of the settings form, the user invokes a communication session between the PDA and data logger to transfer the desired clock/calendar settings to the data logger. The communication can take place over a wireless or hardwired communications channel shared by the PDA and data logger. Other user settings can include data formats and operational mode settings.

Data loggers are typically operated in one of two data collecting modes. The most prevalent mode is time-based mode. In this mode, a data logger is scheduled to obtain data readings from a sensor or number of sensors at a given time interval. For example, a user could schedule a temperature data logger to record temperature readings obtained from an electronic thermometer at a rate of one reading every ten minutes.

Once the desired recording interval and other user settings are transferred to the data logger, the data logger typically goes into a sleep mode to conserve the energy of a battery powering the data logger. Sleep modes for data loggers, generally place processors and communication ports into a power conserving state. For example, a conventional sleep mode usually disables the clock oscillator supplying the instruction cycle timing to a data logger's digital processor, thereby halting the processor. Halting a data logger's digital processor is a major technique for conserving energy.

Traditional time-based data loggers have digital processors that have an interrupt signal line connected to the logical output of an alarm function controlled by a real-time clock. If the data logger in the previous example is equipped with a real-time clock with an alarm function, the processor of the data logger will receive an alarm signal generated by the real-time clock's alarm function every ten minutes. The alarm signal will interrupt and wake the data logger from the sleep mode. Once awake, the data logger will obtain a temperature reading, record the reading and go back into the sleep mode until another alarm signal is generated ten minutes later. Data logging intervals typically range from fractions of a second for rapidly changing sensor data to once per day for slow changing sensor data.

Another operating mode for data loggers is event driven. In an event driven operating mode, a data logger only records data when triggered by an external event. For example, a seismic activity data recorder will only begin recording data after its associated seismic sensor detects a seismic event of a certain predetermined magnitude.

Numerous other operating modes and features are incorporated into modern data loggers. For example, an increasing number of commercially available data loggers have in-circuit firmware programming capability. This capability allows a user to erase a data logger's current firmware and upload new firmware. While the ability to revise a data logger's firmware is a significant advance, an unforeseen problem has surfaced relative to this new capability.

The problem occurs whenever a user programs new firmware into the data logger, but forgets to reinitialize variables such as data memory pointers, etc. Forgetting to initialize data memory pointers after a firmware upload can result in a permanent loss of important data. Removing the data memory pointer initialization burden from the user would be of substantial benefit to the user.

Another previously unsolved problem pertains to attaining baud rates greater than 19.2 kbps between a sleep mode operated data logger and an external user interface device such as a PDA. Receiving a data stream in sleep mode generally involves waking up, receiving a character and then going back to sleep until another character arrives. Up to now, a data logger operating from a sleep mode could not receive a data stream at a baud rate higher than 19.2 kbps because of delays resulting from the data logger's wake-up procedures. In order to receive a data stream at a higher baud rate than 19.2 kbps, prior art communication methods required the processor of a data logger to operate in a mode other than a sleep mode. Unfortunately, operating outside of a sleep mode during a communication session results in excessive energy consumption of a data logger's primary power source. In fact, the battery consumption rate can be tens of times higher than when communicating in sleep mode. What is needed is a computerized method that retains the benefits of sleep mode operation while at the same time maintains the ability to receive data streams at baud rates higher than 19.2 kbps.

Still yet another problem, involves estimating remaining battery capacity of the primary power source. Prior art methods for estimating remaining battery capacity generally rely on a data logger being equipped to measure it's own battery's characteristics. The characteristics typically measured, are battery voltage, battery current and battery temperature. While some of these prior art methods provide reasonably accurate results, they do so at significant disadvantages relative to low power data logger operation. First of all, in order to make the appropriate measurements, extra sensors are needed to make the measurements. Secondly, these extra sensors require power to operate, creating additional loads for the data logger's battery. What is needed is a method for estimating remaining battery life that does not require a data logger to measure its own battery's characteristics.

Another problem lacking an adequate solution up to this point, is due to primary power source disruptions that result in the loss of crucial variable data such as data memory pointers, alarm intervals and the like. The most worrisome power disruptions happen during transportation of data loggers to field sites. Power disruptions can occur when the battery powering a data logger is shaken in its holder, causing momentary loss of power as the battery disconnects and reconnects to the holder's terminals. Another lengthier, yet predictable power disruption occurs whenever the battery is removed from its holder making room for its replacement. If the battery is not quickly reinstalled, residual energy stored in filter capacitors will drain down to a point to which volatile memory locations are corrupted. What is needed is a computerized method that will protect the contents of crucial memory locations during primary power source disruptions.

SUMMARY OF THE INVENTION

The present invention addresses these problems by providing advanced computerized methods for data loggers. The computerized methods provided, are particularly beneficial when used with low-power-battery-operated data loggers.

The problem of a data logger user forgetting to initialize variables such as data memory pointers following a firmware upload is eliminated by providing a computerized method that recognizes the presence of new firmware, and in response, initializes variables automatically. The computerized method will work for any digital processor system having in-circuit programming capability. The method includes a step of determining the presence of new firmware in the processor system and a step of initializing the memory locations with predetermined values upon detecting the presence of new firmware. The determination can be made during or following an initial boot-up of the processor system.

As those skilled in the art will be familiar with, there are various ways to test for the status of an unknown variable. One way to determine the presence of a new firmware upload is to check the status of a new firmware flag. The new firmware flag can be embedded into the firmware as it is programmed into a firmware memory block belonging to a digital processor system. The processor checks the new firmware flag's status after initial boot-up. If the status of the new firmware flag signifies the presence of new firmware, then appropriate variables are initialized to predetermined values. Upon completion of the variable initializations, the status of the new program flag is altered such that it no longer represents the presence of new firmware. In this way, subsequent boot-ups will not result in the re-initialization of previously set variables.

Another computerized method of the present invention solves the problem pertaining to the inability of a sleep-mode-operated data logger to receive a high baud rate data stream. The method includes steps of setting the baud rate of a digital processor system to a value greater than 19.2 kbps, enabling the processor to respond to a communications interrupt, and then placing the processor into a sleep mode. In particular, the method is useful for communicating at baud rates between the ranges of 38.4 kbps and 115.2 kbps.

Other steps involve responding to a communications interrupt by disabling the communications interrupt and placing the processor into a communications loop. Remaining steps include receiving a high baud rate serial data stream until a termination condition is met or detected, ending the communications polling loop, re-enabling the processor to respond to a communications interrupt and returning the processor to a sleep mode.

Still another computerized method estimates the remaining battery capacity of a battery powering a processor system or data logger. The method is highly energy efficient in that it does not involve actively measuring battery characteristics such as voltage, etc. Instead, the method relies on steps of selecting a predetermined battery consumption parameter that is associated or matched to a particular processor activity, and accounting for a decrease in battery capacity by accounting for energy used by the particular processor activity. The energy accounting can be achieved by arithmetically applying the selected battery consumption parameter to a variable representative of remaining battery capacity. The selected battery consumption parameter can be a scaled value representing energy consumed by a processor activity of fixed duration. Examples of processor activities include, but are not limited to, a flash memory erasure, a sensor measurement cycle and a data communication session.

A more complex yet sometimes more accurate, estimate of remaining battery life can be arrived at by selecting a predetermined battery consumption parameter based upon a consumption rate value associated or matched to a particular processor activity, and by multiplying the selected consumption rate by the duration of the processor activity that is complete and then arithmetically applying the resulting battery consumption value to a variable representative of remaining battery capacity.

In either case, the battery consumption values for various processor activities can be derived from laboratory measurements taken from a statistical sample of identical processor systems. A battery consumption value can be derived for each processor activity contemplated for a processor or data logger system. Battery consumption values or rates can then be associated with or matched to particular processor activities in order to build a database that can be loaded along with firmware into the data logger or digital processor system. Once loaded into the processor system, the present method for estimating remaining primary source battery life can be implemented.

Finally, a computerized method is provided for protecting volatile data from power disruptions, wherein the data is stored within a digital processor system having a primary power source and a parasitic power source. The method includes steps of copying data from a non-volatile memory block to a volatile memory block while the processor is being powered by the primary power source. Other steps include erasing the non-volatile memory block while the processor is being powered by the primary power source, and recognizing a disruption of processor system's primary power source. Remaining steps include protecting the data stored in the volatile memory block during the primary power source disruption by copying the volatile memory block data to the non-volatile memory block while the processor is being powered by the parasitic power source. For the purposes of this disclosure, the primary power source can be a single battery cell or a battery pack made up of a number of battery cells. The parasitic power source can come from energy stored in various capacitors normally used to filter the primary power source or the parasitic power can come from energy stored in a high capacitance capacitor dedicated as a backup short duration power source.

DETAILED DESCRIPTION OF THE PREFERRED EMBODIMENT

In the following description it is to be understood that descriptive terms and the like are words of convenience and are not to be construed as limiting terms. It is also to be understood that the illustrations are for the purpose of describing preferred embodiments of the invention and are not intended to limit the invention thereto.

Figure 1:
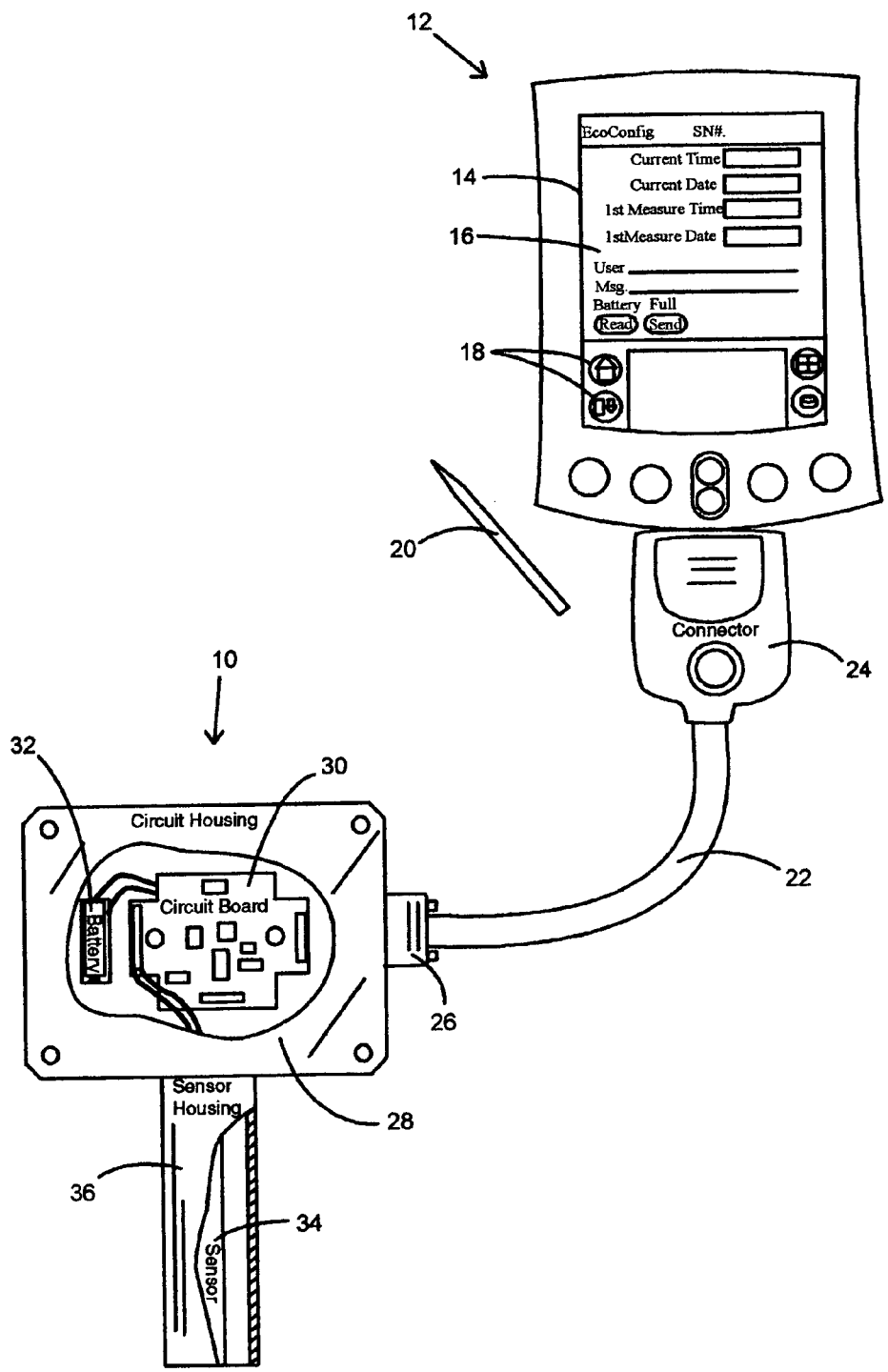
FIG. 1 is a frontal view of a data logger connected through a communications cable to a PDA serving as an external user interface device.

FIG. 1 shows a data logger 10 in communication with an external user interface device 12, which is shown in FIG. 1 as a personal digital assistant (PDA). User interface device 12 includes a display 14 used to present a user with a graphical user interface 16. Icons 18 represent various user selectable software applications or functions. Icons 18 can be selected using a selection device 20.

A communications cable 22 provides a communications channel between data logger 10 and user interface device 12. Connector 24 attached to one end of cable 22 is for temporarily connecting cable 22 to a communication port belonging to user interface device 12. Connector 26 is attached to the opposite end of cable 22 for the purpose of temporarily connecting cable 22 to the communications port of data logger 10. A first housing 28 encloses a digital processor system 30 and a battery 32. Battery 32 is the primary power source for processor system 30. Data logger 10 records sensor readings or measurements taken from a sensor 34. Preferably, a second housing 36 is used to enclose sensor 34 into an appropriate sensing environment.

Figure 2:
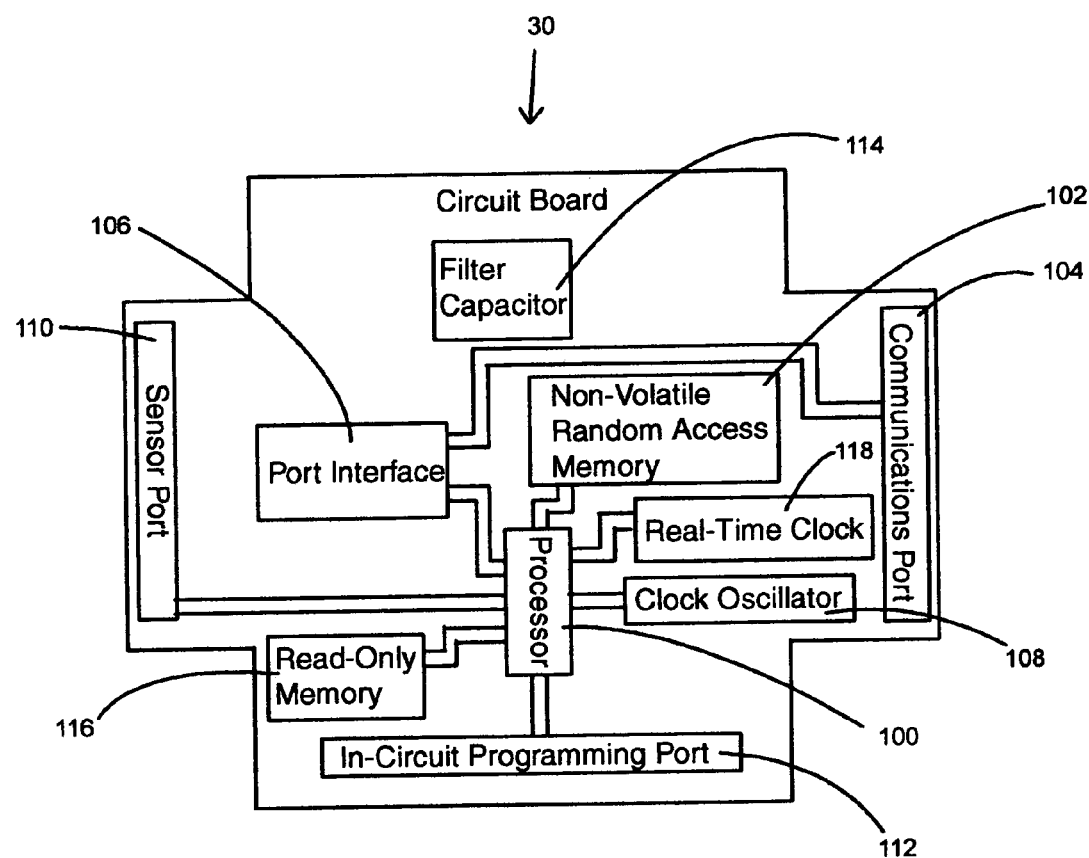
FIG. 2 is a block diagram of a digital processor system for a data logger.

FIG. 2 is a block diagram of digital processor system 30, shown first in FIG. 1. A processor 100 is operationally connected to a non-volatile memory bank 102. A communications port 104 allows external devices to communicate with processor 100. A communications port interface 106 can be used to translate voltage levels between an external device having signal voltages at one level and processor 100 having signal voltages at a different level. Port interface 106 is unnecessary and can be eliminated, if the external device in communication with processor 100 uses signal voltage levels of the same magnitude. A clock oscillator 108 provides the instruction cycle timing for processor 100. In the preferred embodiment, clock oscillator 108 is of the low power watch crystal type that generates a clock frequency of (32,768 kHz).

Processor 100 is preferably connected to a sensor port 110. Sensor port 110 can be dedicated to a specific sensor but it is preferable for sensor port 110 to accommodate various types of sensors. Examples of the types of sensors preferably accommodated by sensor port 110 can be, but are not limited to, water level sensors such as capacitance probes, pressure sensors and contact closure switches like those used in tipping bucket rain gauges.

Processor 100 is also preferably connected to an in-circuit programming port 112, which allows firmware to be programmed into a flashed-based memory block within processor 100. A filter capacitor 114 filters the primary power for processor system 22 and serves as a source of parasitic power during primary power disruptions. In the preferred embodiment, a read-only memory chip 116 contains a unique serial number for identifying digital processor system 30. A real-time clock 118 generates interval alarms as well as calendar functions. It is possible to eliminate the hardware of real-time clock 118 by implementing real-time functions by way of firmware, provided enough firmware memory space is available. A firmware implementation of real-time clock functions is a particularly attractive option in the case of event driven data loggers.

Figure 3:
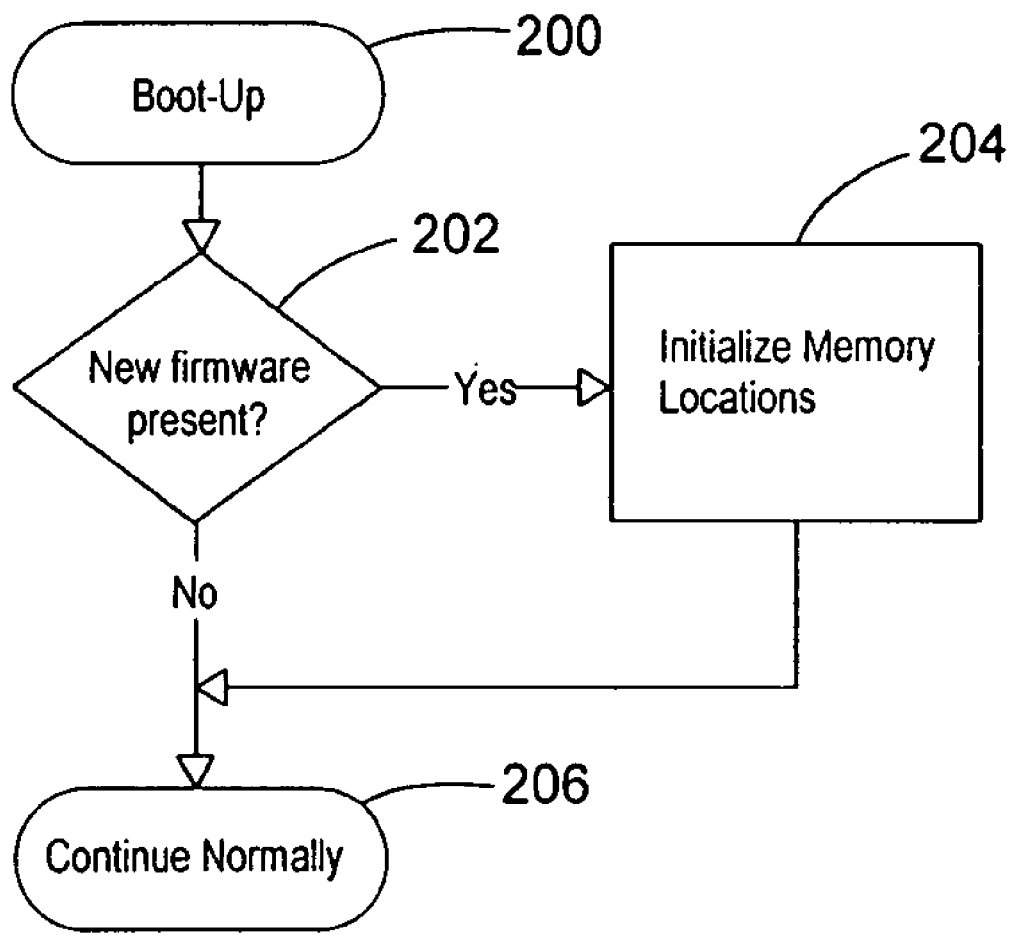
FIG. 3 is a flow chart of a computerized method for automatically initializing memory locations after a new firmware upload.

FIG. 3 is a flowchart of a computerized method for automatically initializing predetermined memory blocks or locations within processor system 30 after a new firmware upload. The method starts at boot-up 200. During boot-up or shortly thereafter, decision block 202 tests for the presence of new firmware by checking the status of a new firmware flag contained in a memory location. The new firmware flag is made up of at least one logical bit. The presence of new firmware can be represented by a predetermined logic state of one or more bits. For example, the most significant bit of a new firmware flag could be set to a logic one representing the presence of new firmware. Alternately, the most significant bit of the new firmware flag could be cleared to a logic zero to represent the absence of new firmware. In this case, a positive test for new firmware can be conducted using a logical bit test operation such as performing a logical AND operation between the most significant bit of the new firmware flag and a logic one operand. If the result of the AND operation is a logic one, then new firmware is detected and the method continues on to block 204 which initializes predetermined memory locations with predetermined values. The initialization process undertaken by block 204 can include the erasure of non-volatile memory. Example of the types of memory that can be erased include but are not limited to, flash-based data memory, electrically-erasable-read-only memory, ferro-electric random access memory and removable flash based media such as media cards used in data loggers, mp3 players and digital cameras.

Other initializations include setting all data memory pointers to a predetermined factory setting. Also, the alarm interval of a real-time clock function can be set to a predetermined factory value as a precaution. The user can overwrite the factory value, but in case the user forgets to initialize the alarm interval, the data logger will be preset to record data at regular intervals.

The actions of block 204 can also include altering the contents of the new firmware flag location. In the previous example, this alteration would include clearing the most significant bit to a logic zero. In this way, the new firmware flag represents the absence of new firmware and subsequent boot-ups would result in skipping the memory initializations of block 204. Instead, the method would progress normally as shown by block 206.

Figure 4:
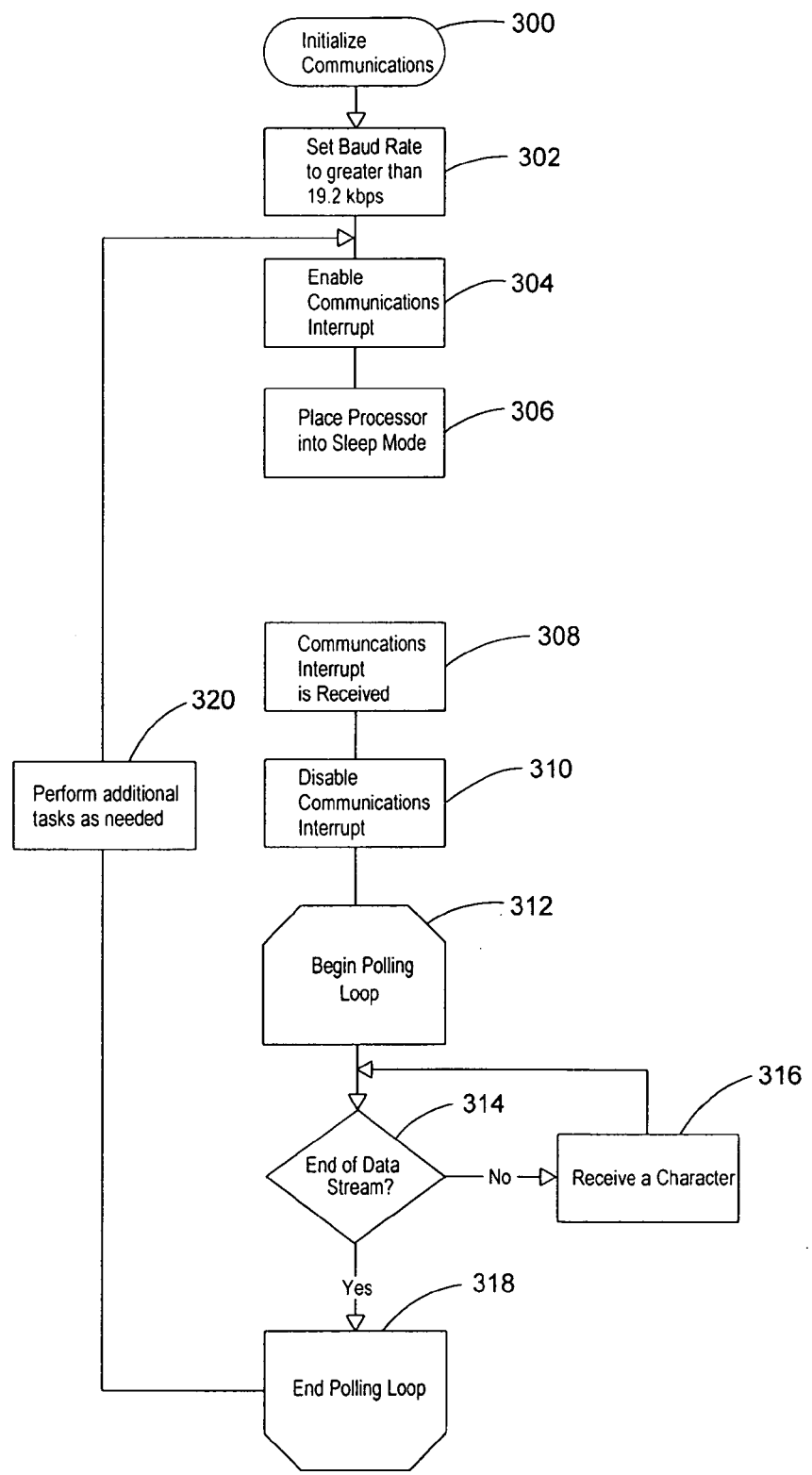
FIG. 4 is a flow chart of a computerized method that makes high data rate communications possible for a data logger operating in sleep-mode.

FIG. 4 is a flow chart showing a hybrid serial communications method for receiving high baud rate data while a data logger is operating in a sleep mode. The method starts with block 300, communications port initialization. At this point the initialization is standard, such as setting parity, number of bits per data packet, etc. In block 302, the baud rate is set to a high value, at least to a value greater than 19.2 kbps. In block 304, a communications interrupt, is set for the port ready to receive a high baud rate serial data stream. The communications interrupt can be set to either edge triggered or level triggered, depending upon the processor used. Block 306 places the processor in a sleep mode to conserve battery power. Some processors have more than one sleep mode. Usually, the sleep modes vary in levels of energy conservation. For example, Texas Instruments Corporation manufactures a family of microcontrollers known as the MPS430 family that is particularly suitable for battery operated data loggers. The MPS430 family includes two sleep modes. One sleep mode disables the processor, but enabled peripherals can remain active. The other sleep mode disables the processor and all peripherals with the exception to enabled interrupts.

The processor will remain in a sleep mode until interrupted. The interrupt can be an alarm from a real-time clock or it can be a communications interrupt as shown in block 308. A communications interrupt occurs whenever a character enters a communications port. This character is signaled by the transition of voltage level on a communications interrupt terminal or pin. The communications interrupt is disabled before another character arrives. Preferably, the communications interrupt is disabled immediately, as shown in block 310. Unlike conventional sleep mode serial communications procedures, the remaining characters of a serial data stream are received within a polling loop. Block 312 begins the polling loop. Decision block 314 tests for a loop termination condition that can include testing for the end of the data stream. If more characters remain and other termination conditions are not met, block 316 receives a character and control of the polling loop returns to decision block 314. If all the characters of the data stream have been received or another termination condition is met, the polling loop is ended as shown in block 318. Once the polling loop ends, additional tasks can be performed as needed as shown in block 320. After the addition tasks are complete, the process returns to block 304, where the communications interrupt is enabled to receive another data stream. The processor can then be put back to sleep as shown in block 306.

Decision block 314 can test for a predetermined string termination character such as a null character, etc. Other termination conditions can be but are not limited to counting to a predetermined number of loop passes, counting the number of characters received, or by counting down a time value loaded in a watchdog timer register.

Figure 5:
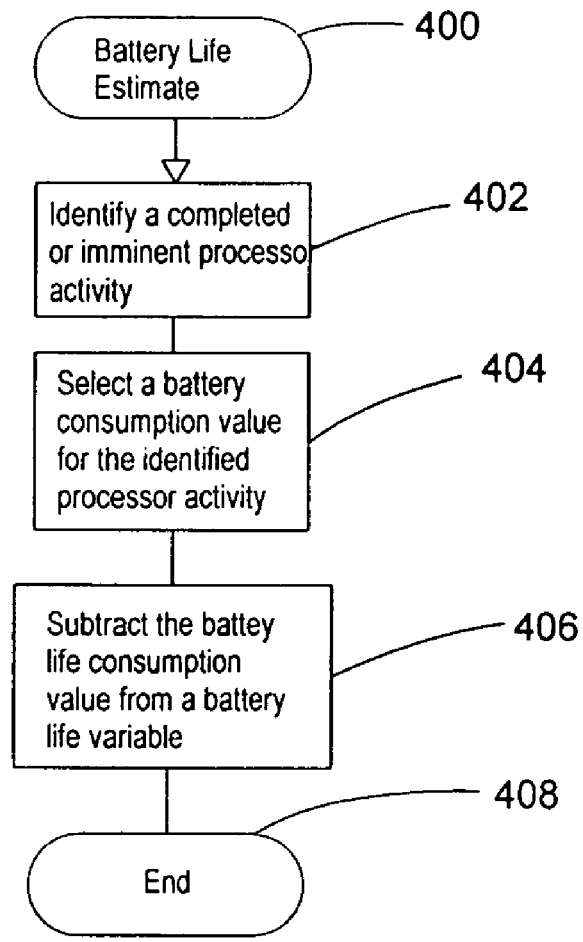
FIG. 5 is a flow chart of a computerized method for estimating data logger battery life using battery consumption values.

FIG. 5 shows a flow chart of an energy efficient method for estimating the remaining battery life of a battery providing primary power to a data logger. The method for estimating battery life starts at block 400. The next step, depicted by block 402, identifies a completed or imminent processor activity. Identifiable processor activities can be, but are not limited to, transmitting and receiving data, sensor reading, data recording and non-volatile memory erasing. Furthermore, the quiescent energy consumed during sleep periods is also defined as a processor activity for energy accounting purposes. Preferably, quiescent energy consumption is accounted for once per day.

Once a processor activity is identified, a battery consumption value is selected as shown in block 404. The selected battery consumption value is then subtracted from a battery life variable, as shown in block 406. The next time the user communicates with the data logger, a battery life value held by the battery life variable can then be reported to an external user interface similar to PDA 12, shown in FIG. 1. The battery life value is an estimate of remaining battery life. The user considers this estimate when determining whether or not it is necessary to change the data logger battery. Each time a new battery is installed, the battery life value held by the battery life variable is initialized to a value that represents full battery life. The battery life estimation process ends with block 408.

Figure 6:
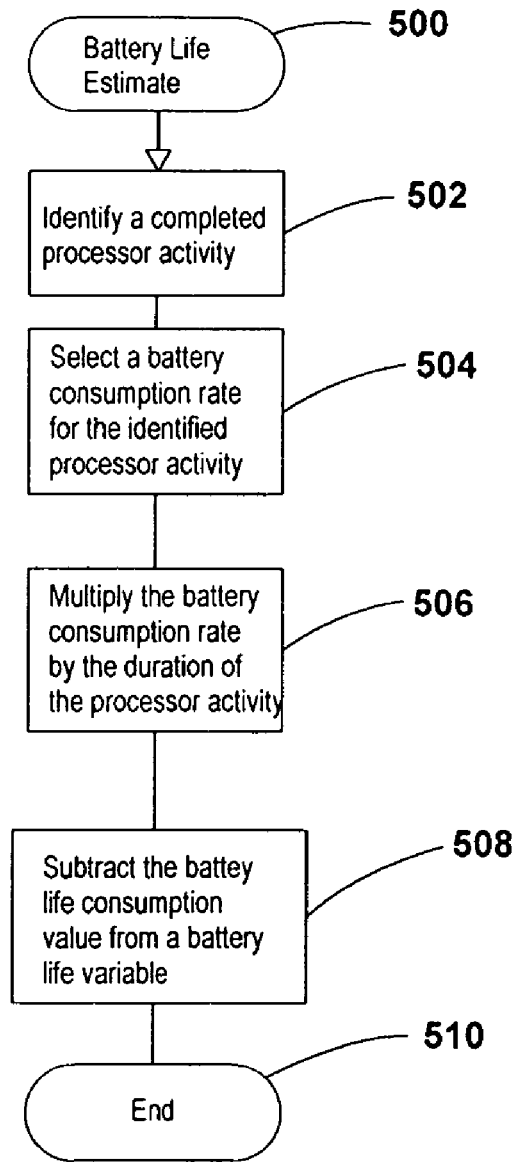
FIG. 6 is a flow chart of a computerized method for estimating data logger battery life using battery consumption rates.

FIG. 6 shows a flowchart for a battery life estimate that is more accurate in cases where the duration of a processor activity is not predetermined. The process starts with block 500 and continues to block 502, where a completed processor activity is identified. Next, as shown by block 504, a battery consumption rate is selected for the identified processor activity. The battery consumption rate selection can be made from a database of processor activities matched to a list of predetermined battery consumption rates.

Next a battery consumption value is obtained by multiplying the battery consumption rate by the duration of the identified processor activity. As shown in block 508, a battery life estimate can be obtained by subtracting the battery consumption value from a battery life variable. The battery life estimation process ends with block 510.

As with the flow chart of FIG. 5, the battery life value held by the battery life variable can then be reported to an external user interface similar to PDA 12 shown in FIG. 1 the next time the user communicates with the data logger. The battery life value reported is an estimate that the user considers when determining whether or not it is necessary to change the data logger battery.

Figure 7:
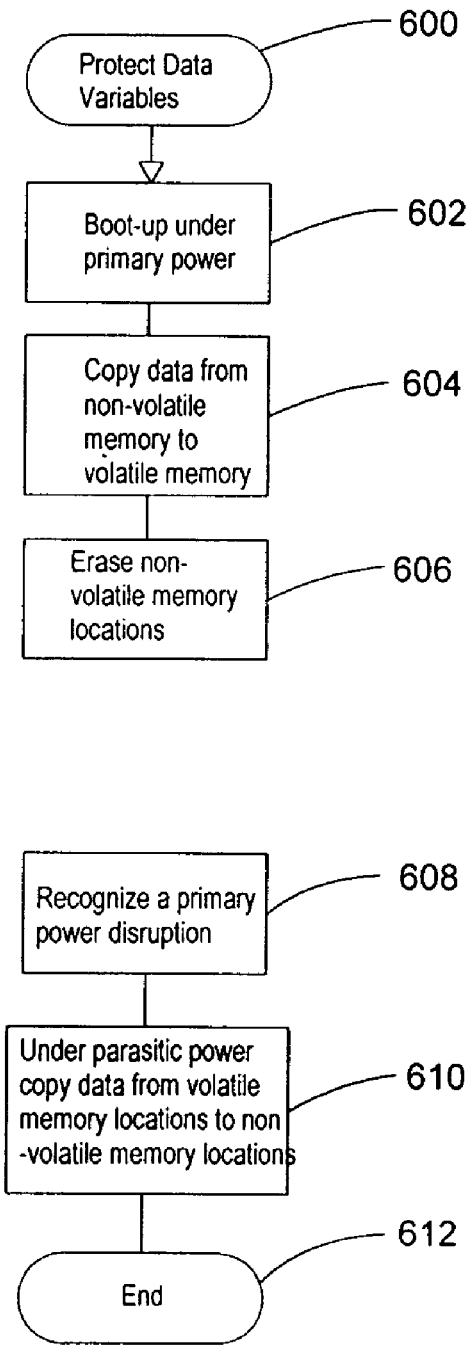
FIG. 7 is a flow chart of a computerized method that protects data variables in the event of a primary power disturbance or failure.

FIG. 7 is a flow chart showing a method for protecting crucial data variables during primary power source disruptions. Primary power sources can include, but is not limited to, line power, batteries, photovoltaic cells and fuel cells. Power source disruptions inadvertently occur during transportation of a powered data logger. Whenever a data logger is transported, mechanical impulses and vibrations force the primary power source's terminals to intermittently make and break contact with connectors or contacts through which electrical current flows from the primary power source to the processor system of the data logger. These intermittent power disruptions can deprive the data logger's volatile memory of the energy it needs to maintain its proper contents. The method illustrated by the flow chart in FIG. 7, protects crucial variables such as data pointers and alarm values by writing the crucial data to non-volatile memory during each power disruption.

The method begins with block 600 and continues with block 602 as the data logger's processor system boots-up under primary power. Preferably, the step of block 604 immediately follows system boot-up. During this step, crucial data such as memory pointers are copied from non-volatile memory to volatile memory so that their values can be updated. It is also preferable, that a step is taken in block 606 to immediately erase the non-volatile memory block from which the crucial values were copied. It is preferable that this particular non-volatile memory block is completely erased so that the updated and/or copied values can be written back to the memory block as rapidly as possible during a power disruption. It has been discovered that non-volatile memory write back operations for many processor systems is quicker, if the memory block to be written to is pre-erased. Under the conditions of a power disruption, a swift write to non-volatile memory is vital to prevent data loss. Power disruptions lasting as little as tens of milliseconds can result in data loss if the data is not quickly written to non-volatile memory.

Once the appropriate non-volatile memory block or locations have been erased by a step in block 606, the data logger system can perform other tasks. However, as shown in block 608, the processor system must be able to recognize a primary power disruption. A processor in a data logger is usually equipped to determine a power disruption by way of a power-on-reset interrupt or similar internally generated interrupt condition. If a processor does not have this built-in capability, then an external brown-out detection circuit can be added to the processor system to generate an interrupt during brown-out or power disruption conditions.

Once a primary power disruption is recognized, a step in block 610 copies crucial data from volatile memory to non-volatile memory while the processor is being powered by one or more parasitic power sources. The parasitic power sources can be, but are not limited to, filter capacitors belonging to the data logger's processor system. Other parasitic power sources can include dedicated back-up power capacitors or inductors sometimes present in some power filtering circuits. The data protection process ends with block 612.

It will be apparent to one skilled in the art that many modifications and variations can be made to the present invention without departing from its spirit and scope. Therefore, the invention is not to be limited by the description of the preferred embodiment but is to be limited only by the scope of the following claims.

What is claimed is:

1. A computerized method for protecting a data logger's volatile data from power disruptions resulting from momentary battery power source disconnects, wherein the data is stored in a volatile memory block within a data logger's digital processor system having a battery power source and a parasitic power source, said method comprising:

copying data memory pointers and data logger alarm intervals from a non-volatile memory block to a volatile memory block immediately after boot-up of the system while the processor is being powered by the battery power source;

erasing the non-volatile memory block immediately after said copying while the processor is being powered by the battery power source;

recognizing a disruption of processor system power coming from the battery power source; and protecting the data memory pointers and data logger alarm intervals stored in the volatile memory block during the battery power source disruption by copying the volatile memory block data memory pointers and data logger alarm intervals to the non-volatile memory block while the processor is being powered by the parasitic power source.

2. The method of claim 1, further including a step of providing a filter capacitor to store energy for said parasitic power source.

3. The method of claim 1, further including a step of providing an inductor to store energy for said parasitic power source.

4. The method of claim 1, wherein recognizing disruption of processor system power coming from the battery power source includes a step of interrupting said processor in response to a drop in battery power source voltage below a predetermined threshold.

* * * * *